US007162517B2

(12) United States Patent
Hallenbeck

(10) Patent No.: US 7,162,517 B2
(45) Date of Patent: Jan. 9, 2007

(54) TIMEKEEPING APPARATUS PROVIDING PREMISES-AUTOMATION-RELATED FUNCTION THROUGH A NETWORK

(76) Inventor: Peter D. Hallenbeck, 3500 Jordan Oaks Dr., Efland, NC (US) 27243

( * ) Notice: Subject to any disclaimer, the term of this patent is extended or adjusted under 35 U.S.C. 154(b) by 734 days.

(21) Appl. No.: 10/119,613

(22) Filed: Apr. 10, 2002

(65) Prior Publication Data

US 2002/0191636 A1 Dec. 19, 2002

Related U.S. Application Data

(60) Provisional application No. 60/298,313, filed on Jun. 14, 2001.

(51) Int. Cl.
*G06F 15/16* (2006.01)

(52) U.S. Cl. .................................... 709/208

(58) Field of Classification Search ................. 709/208, 709/223, 229; 710/3, 5
See application file for complete search history.

(56) References Cited

U.S. PATENT DOCUMENTS

| 4,307,460 | A | 12/1981 | Polonsky |
| 5,086,385 | A | 2/1992 | Launey et al. |
| 5,218,552 | A | 6/1993 | Stirk et al. |
| 5,388,150 | A | 2/1995 | Schneyer et al. |
| 5,481,750 | A | 1/1996 | Parise et al. |
| 5,510,975 | A | 4/1996 | Ziegler, Jr. |
| 5,519,878 | A | 5/1996 | Dolin, Jr. |
| 5,541,585 | A | 7/1996 | Duhame et al. |
| 5,544,036 | A | 8/1996 | Brown et al. |
| 5,570,085 | A | 10/1996 | Bertsch |
| 5,572,438 | A | 11/1996 | Ehlers et al. |
| 5,621,662 | A * | 4/1997 | Humphries et al. ......... 700/276 |
| 5,684,710 | A | 11/1997 | Ehlers et al. |
| 5,706,191 | A | 1/1998 | Bassett et al. |
| 5,761,083 | A | 6/1998 | Brown, Jr. et al. |
| 5,793,125 | A | 8/1998 | Tarng |
| 5,815,086 | A | 9/1998 | Ivie et al. |
| 5,842,032 | A | 11/1998 | Bertsch |
| 5,893,073 | A | 4/1999 | Kasso et al. |
| 5,924,486 | A | 7/1999 | Ehlers et al. |
| 5,938,757 | A | 8/1999 | Bertsch |
| 6,021,324 | A | 2/2000 | Sizer, II et al. |

(Continued)

OTHER PUBLICATIONS

Water et al., *Electronic Design News*, "Design Techniques for Plug-and-Play In "Smart Homes" Consumer Products", (Aug. 1997) Section 17, vol. 45; p. 64.

(Continued)

*Primary Examiner*—Andrew Caldwell
*Assistant Examiner*—Stephan Willett
(74) *Attorney, Agent, or Firm*—Moore & Van Allen PLLC; Steven B. Phillips

(57) ABSTRACT

Timekeeping apparatus providing premises-automation-related function through a network. A household appliance or device such as a bedside alarm clock provides time-based control functions as well as premises automation related functions. The device is connected to the premises automation system through a local area network (LAN), or some other type of network interface. The device contains a display unit to display the time and other information. The device also includes an internal processing system that controls the device to provide the time-based control function and to send and receive messages over the network. Sent messages can include time-keeping status information, reports of user input, or packets designed to set outputs in the premises automation system. Received messages can control local actions such as time settings and display of premises automation status information.

31 Claims, 5 Drawing Sheets

U.S. PATENT DOCUMENTS

| | | |
|---|---|---|
| 6,029,092 A | 2/2000 | Stein |
| 6,546,419 B1* | 4/2003 | Humpleman et al. ....... 709/223 |
| 6,678,215 B1* | 1/2004 | Treyz et al. .................. 368/10 |
| 2001/0010032 A1* | 7/2001 | Ehlers et al. ................. 702/62 |
| 2001/0025322 A1* | 9/2001 | Song et al. ................. 709/249 |
| 2002/0000092 A1* | 1/2002 | Sharood et al. ............... 62/127 |
| 2002/0022991 A1* | 2/2002 | Sharood et al. ............... 705/14 |
| 2002/0037716 A1* | 3/2002 | McKenna et al. .......... 455/422 |
| 2002/0078818 A1* | 6/2002 | Elliott ......................... 84/609 |
| 2002/0163534 A1* | 11/2002 | Choi et al. .................. 345/734 |
| 2002/0180579 A1* | 12/2002 | Nagaoka et al. ............. 340/3.1 |
| 2003/0014535 A1* | 1/2003 | Mora ......................... 709/235 |
| 2005/0174889 A1* | 8/2005 | Marcantonio et al. ........ 368/12 |

OTHER PUBLICATIONS

Webb, *Electronic Design News*, "Consumer Bus Defends Home Turf", (Jul. 1999) Section: Feature p. 83.

Radio Shack Answers Catalog, "Programmable Control Center with Timer Gives your Home . . . ", (2000), p. 259.

\* cited by examiner

TIMEKEEPING APPARATUS PROVIDING PREMISES-AUTOMATION-RELATED FUNCTION THROUGH A NETWORK

CROSS-REFERENCE TO RELATED APPLICATIONS

This application claims priority from co-pending provisional patent application Ser. No. 60/298,313 filed Jun. 14, 2001 by the inventor hereof, the entire disclosure of which is incorporated herein by reference. Some of what is disclosed in this application is also disclosed in co-pending application Ser. No. 10/068,157, filed Feb. 6, 2002, by the inventor hereof, which is also incorporated herein by reference.

BACKGROUND

Premises automation systems, also commonly referred to as "home automation systems," have always had to deal with the manner in which the occupants of the house or other building interact and direct the system. Many existing systems use dedicated keypads on the wall or on a pedestal for gathering user input and displaying system output. A premises automation system is configured by specifying one or more event-driven chains of actions. Through configuration, the system is directed to take specific action (actuate various control outputs) when specific inputs are actuated. In addition to physical inputs such as switches for lights, sensors on doors, and motion detectors, there are "states" the premises can be in. For example, from a security point of view, the system often needs to "know" if the building is occupied. From a lighting perspective, the system may need to know if it's dark outside. If the premises is a home, the implementation of some security or other features may require knowledge of whether or not the occupant or occupants are asleep or awake.

A simple, familiar, and easily understandable type of interaction with a premises automation system might consist of pressing a button to initiate a perceptible, noticeable change. One example would be depressing a button to activate a specific lighting configuration. The button press initiates a chain of events (as specified during configuration) ending with the correct light or lights turning on. People are familiar with these types of actions. However, a change of state of the premises has no equivalent familiarity, since it is not always directly associated with a perceptible event. Current home alarm and/or automation systems often have keypads near the door of the house most often used to enter and exit the house, and in the sleeping area. To reap full benefits of the automation system, the occupants must not only learn to press buttons to indicate that they are leaving or returning, but also press buttons that indicate that they are going to sleep or getting up. Since these button presses are not associated with a perceptible, external event, and must be executed at a keypad that seems removed from the occupants' routine, the button presses are often forgotten.

SUMMARY

The present invention, in exemplary embodiments, is characterized by a "bedside" alarm clock or other household apparatus, device, or appliance that combines time-based control functions with premises automation input and/or output and display functions, and possibly other functions. In some embodiments, the device is connected to the premises automation system through a local area network (LAN), now commonly providing connectivity in premises automation systems. A device according to the invention can also be connected to a system through a serial link or any other type of network interface. In some embodiments, the premises automation system can access and change the local settings of the device such as current and alarm times. Timekeeping status information from the device, including whether the alarm is set, can be received by the premises automation system and used to determine or change the state of the premises. The device can also include buttons for users to enter premises automation related commands directly. Because premises automation functions can be controlled from a familiar device connected with daily activities, interactions with the system are more familiar and natural, resulting in more consistent use of the premises automation system.

In some embodiments, the apparatus of the invention includes a display unit operable to at least display a time, the network interface that provides two-way messaging and an input panel operable to accept user input via buttons or similar actuators. The device also includes an internal processing system operatively connected to the display unit, the network interface, and the input panel. The processing system, with any included software or microcode, controls the device to provide the time-based control function and to send and receive messages over the LAN, serial network link, or other network interface. The device may also contain other application specific hardware if it is a household device or appliance that includes normative functions in addition to the clock function. A few possible examples of such a household device include a kitchen appliance, telephone device, HVAC system device, lawn sprinkler controller, and audio/video entertainment devices. The above described hardware and code forms the means to carry out the invention.

The sent messages are formatted so that they can enable premises automation function. The sent messages can include timekeeping status information, reports of user input, or packets designed to set outputs in the premises automation system. Received messages can control local actions such as time settings, display of premises automation status information, playing a sound, or activating emergency illumination. They may also initiate other functions depending on the type of device in which the invention is being used. A device according to the invention can have a built-in power supply, or may accept power from the premises automation system.

In some embodiments, premises status is communicated to the premises automation system based on user input that is usually thought of as being directed to a normative function of the household device, such as when an occupant turns on the alarm before going to bed in the case of an alarm clock. When that user input is detected, a message that is formatted to be understood by the premises automation system so that premises automation function can be effected is assembled and sent over the network interface. The appliance according to the invention can also receive incoming messages that query one or more local settings of the device. The device determines the setting, assembles a reply message and sends the message back to the premises automation system over the network interface. A setting in this case may be, for example, the alarm setting.

DETAILED DESCRIPTION OF ONE OR MORE EMBODIMENTS

Figure 1:
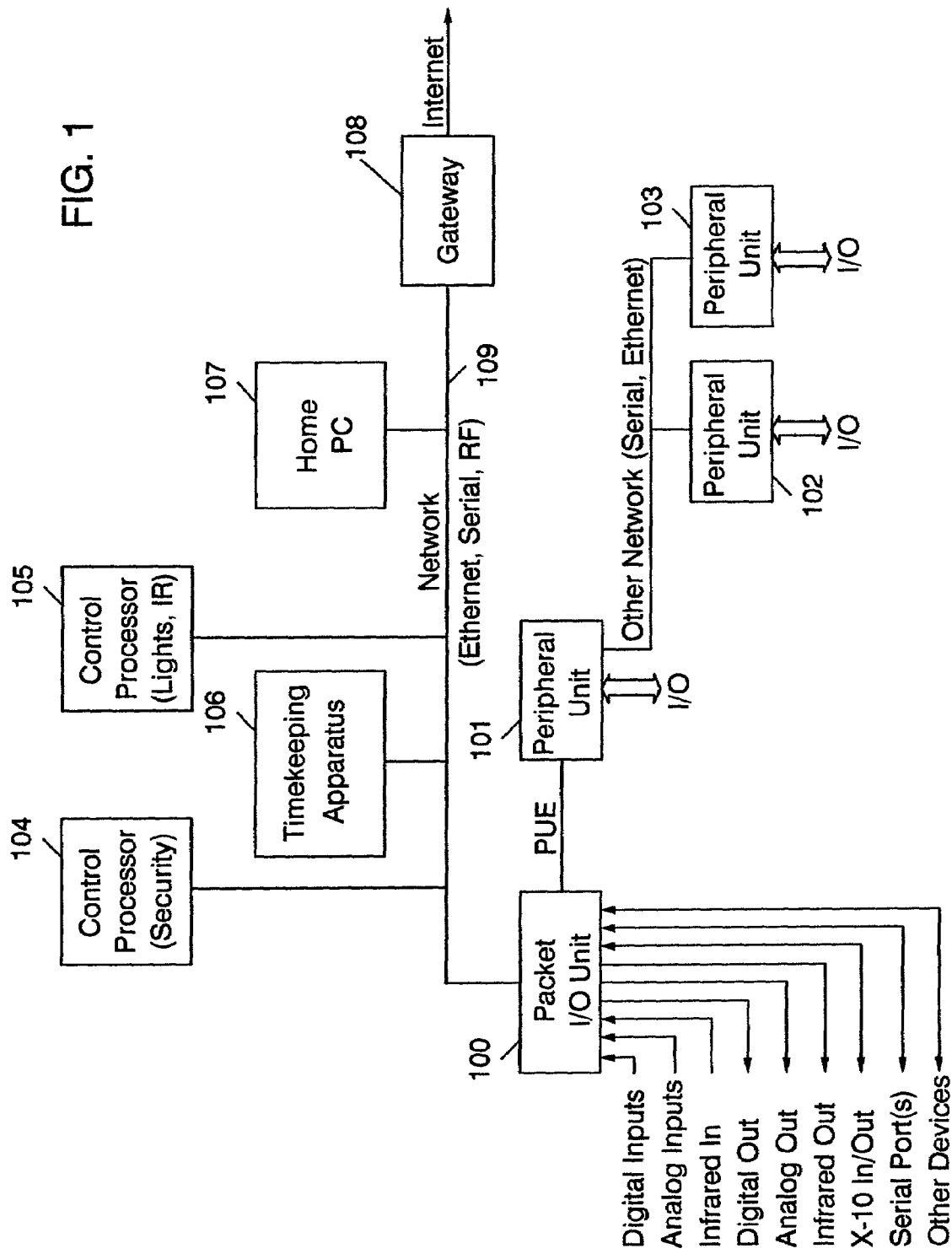
FIG. 1 is a network block diagram illustrating one type of premises automation system in which an embodiment of the invention is being used.

The operation of the invention can be more readily understood if the types of premises automation systems in which it operates are first described. FIG. 1 is a network level block diagram showing one type of premises automation system with which the invention can be used. This particular type of system is a distributed system and relies on packet-based communication between most of the major components for its function. The system of FIG. 1 is fairly large; however, it is shown by way of example only. This system is comprised of multiple input/output (I/O) units, 100, 101, 102, and 103. Packet I/O unit 100 is connected to a home local area network (LAN) including control processor 104 for a security system, control processor 105 which provides lighting and infrared device control, and a device combining time-based control function and premises automation input/output function according to the present invention, called for purposes of illustration, timekeeping apparatus 106. A home personal computer, 107, and Internet gateway 108 can also be connected to this network, and are shown in this example. The LAN, 109, is often an Ethernet, but can also be a radio frequency (RF) wireless network, a serial network, a token ring network or any other type of network. For convenience it is referred to as a LAN throughout this disclosure, and the interface within the clock that connects to it is referred to as a network interface.

The additional I/O units are connected to unit 100 via a specialized type of serial port on units 100 and 101, which is called herein a "peripheral unit expansion" (PUE) interface, to be described in detail later. The PUE electrical interface in the example embodiments shown is similar to an "RS-485" port, but may take other forms. Additional units 102 and 103 are connected to unit 101 through a second home network in this example, although they could also be connected through the PUE interface. Units connected through the PUE interface are typically smaller in size, cost, and capability, and are thus referred to as "peripheral I/O units" or simply "peripheral units," not to be confused with the term "peripheral" as applied to computer peripherals. The serial type PUE interface is slower than many types of network connections, such as Ethernet, but this slower speed is acceptable because of the smaller data bandwidths of the peripheral units.

Each I/O unit has a number of different devices that can connect to it's inputs and outputs. Some devices, such as switches and relay contact closures, require quire little processing. Others, such as analog voltages that represent temperatures, will require a little more processing. And some, such as serial ports and infrared I/O will require still more processing. Some of these inputs and outputs are illustrated in FIG. 1 as connected to packet I/O unit 100. These include digital inputs and outputs, analog inputs and outputs, infrared inputs and outputs, X-10 ports, and serial ports. The peripheral I/O units have similar types of I/O, but specific inputs and outputs are not shown for clarity. Further details on the premises automation system of FIG. 1 are contained in the related applications cited at the beginning of this disclosure.

Figure 2:
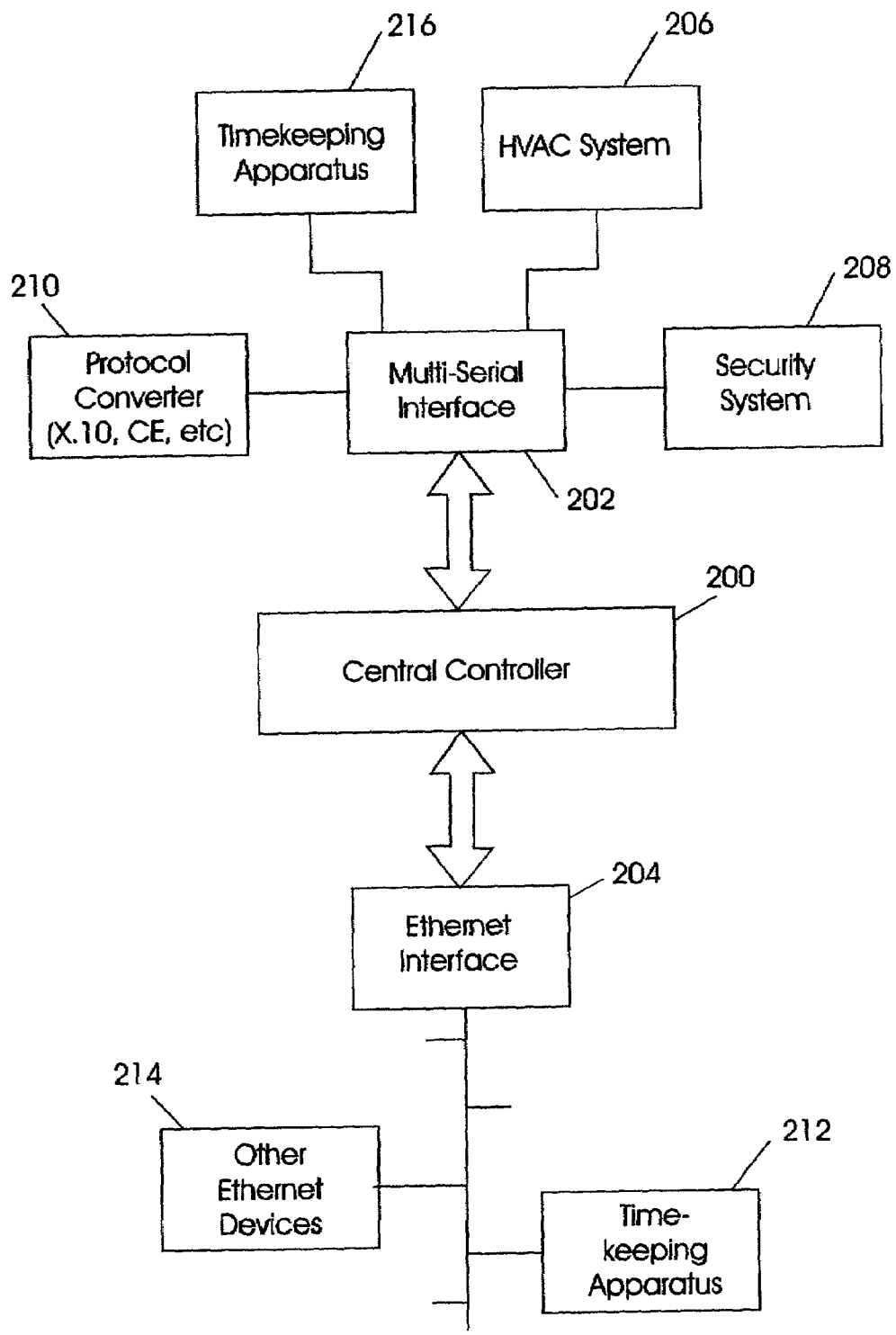
FIG. 2 is another network block diagram illustrating another type of premises automation system in which an embodiment of the invention is being used.

FIG. 2 illustrates another type of premises automation system with which the present invention can be used. In this case, a home automation system utilizing a central controller rather than distributed control is illustrated. There are numerous systems of this type available, and such systems are well understood and well known. Such systems may provide comprehensive premises automation features, or may simply control certain, limited aspects of the premises. U.S. Pat. Nos. 5,086,385 and 5,706,191 are but two examples of premises automation systems with central controllers, and are each incorporated by reference herein. The system in FIG. 2 is shown as an example only, but will be briefly described herein for the convenience of the reader.

FIG. 2 is a block diagram representation of a home automation system with a central controller, 200. This controller can be built around a personal computer or workstation, or can be a stand-alone controller specifically designed for home automation. In any case, it contains, at a minimum, a central processing unit (CPU) and memory. It may also contain fixed or removable storage media devices. The central controller 200 is connected, by means of a data bus, or its equivalent, through a plurality of standard or custom interfaces to either control each of the subsystems automated within the premises environment or to transmit or receive either data or instructions from within the premises environment. The central controller accesses these subsystems in this case through a multi-serial interface, 202, and a network interface, 204. In this case, an Ethernet LAN is used. If the central control system is a personal computer or workstation, the multi-serial and Ethernet interfaces may be devices actually installed in the workstation as adapter cards. Alternatively, they can be independent devices connected through a standard interface such as a universal serial bus (USB). In the case of a dedicated central controller such as might be installed in a basement or wiring closet, they may be connected through some type of proprietary interface.

In this example, multi-serial interface 202 provides connectivity through an RS-232 type serial interface to numerous household systems, such as the HVAC system, 206, and the security system, 208. If a premises system uses a protocol other than RS-232 or the LAN protocol, then a protocol converter, 210, can be used to convert between the RS-232 protocol and the protocol utilized by the device to be controlled. In this example, protocol converter 210 provides connectivity via X.10 and CE Bus.

The system of FIG. 2 is designed to connect to a LAN such as Ethernet, by means of the Ethernet network interface, 204. Using such an interconnection, a wide variety of applications such as information retrieval and remote home automation control can be achieved. In this particular example, a time-based control and premises automation device according to the invention is shown as timekeeping apparatus 212 on the Ethernet of the system of FIG. 2. Other Ethernet devices, 214, are also shown by way of illustration. It is important to note that a device according to the invention can connect to a premises automation system in a variety of ways. To illustrate this point, a second timekeeping apparatus according to the invention, 216, is shown connected to the multi-serial interface.

Figure 3:
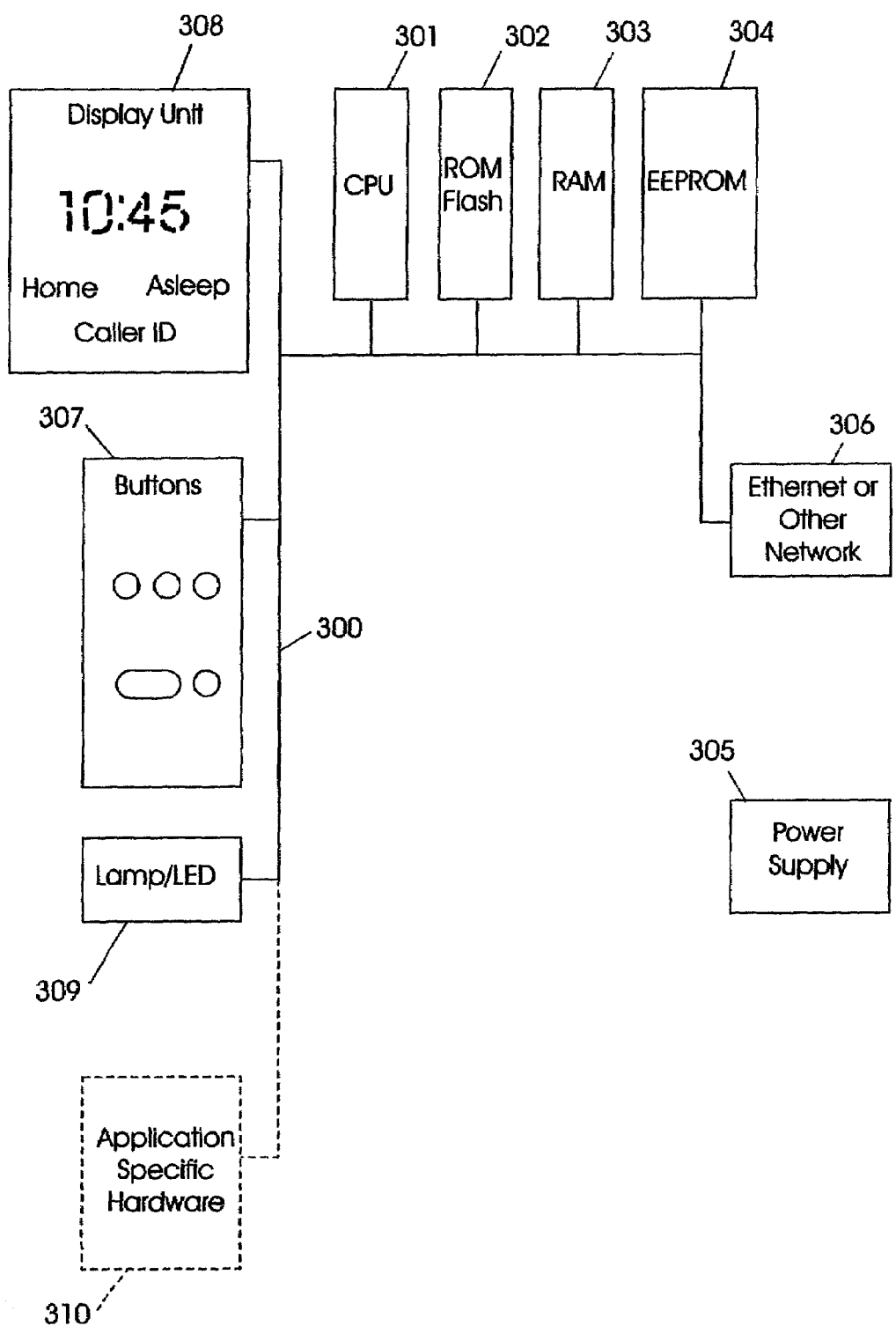
FIG. 3 is a functional block diagram of an embodiment of the invention.

FIG. 3 is a hardware block diagram of an example combination timekeeping appliance and premises automation device for connection to a home or premises automation system. The various subsystems of the device are interconnected by an internal bus, 300. The device contains a processor or CPU, 301. Storage devices, in this case various types of hardware memory, are included, and are operatively interfaced to the processor. The memory includes flash ROM 302, RAM 303, and EEPROM 304. Flash ROM 302 typically stores programming information. RAM 303 is used for buffering. EEPROM 304 is used to store configuration and other information. Power for the device is provided by power supply 305. A network interface, 306, is provided to communicate with the premises automation system. In this example, an Ethernet connection is specifically mentioned, however, any type of local area network (LAN) interface, or other type of network connection, such as a serial interface, can be used.

An input panel, 307, is provided. In this example embodiment, the input panel is essentially a keypad entry unit for providing human input to the system. Buttons on this keypad could cause the unit to send certain messages, for example, encapsulated in packets, to the premises automation system. They could also provide a way to change local settings, or some combination of the two. Some of the buttons may also provide appliance type functions, as it should be noted that the hardware platform described herein can be combined with other, well known, traditional apparatus to produce intelligent input/output devices for the home. For example, the time-based control and premises automation function of the invention could be combined with a kitchen appliance, a telephone device, an HVAC system device, a laundry appliance, a device for controlling a lawn sprinkler system, or an audio/video entertainment device such as an analog or digital video recorder, or a so-called "personal video recorder" or "PVR." Note that user input according to the invention can be widely varied depending on the type of appliance or device involved. It might include voice interaction or such things as hookswitch activation in the case of a telephone device, as in when a telephone handset is picked up on a telephone device. Anything a user does that constitutes an interaction with a device that results in actuation of any mechanical, electronic, acoustic or other control or input means can be considered user input.

Since a device or appliance according to the invention can provide multiple functions, various terms have been used herein to categorize these functions. A "time-based control function" is a function or group of functions or operations related to locally controlling an appliance based on time. For example, time-based control functions for an alarm clock would include setting of an alarm at a specific time to wake a person, indicating A.M. and P.M., etc. In the case of an oven, time-based control functions would include turning the oven on and off at pre-set times. In the case of an audio/video entertainment device the time-based control function might include setting the device to record a particular television program at a particular time. A time-based control function in some embodiments would even include the displaying of the local time or other stored times and the updating of that display. A "normative function" is a function or operation that would be familiar to the user as a common function of the device. These include time-based control functions, but may include other functions such as simply turning an oven on and setting the temperature, or in the case of a telephone, pushing buttons to enter a number. A "premises automation function" is any change in settings, status, or information in the premises automation system or any household devices or apparatus connected to the premises automation system.

The device of FIG. 3 also contains a display unit, 308. The display unit can display the current time, alarm time, and other local settings or information related to the normative function of the device. The display unit may also display information as part of its premises automation display function, such as system status, caller ID information, etc. In many cases this information is communicated to the device over the network interface. The display unit is further discussed in reference to the alarm clock embodiment illustrated in FIG. 4, below. In the example of FIG. 3, the device also contains a lamp or bright light emitting diode (LED), 309. This light can be turned on as emergency illumination if the premises automation system detects a power failure. The light is turned on by the processor when so directed by a message received from the premises automation system over the network interface, 306. If the timekeeping apparatus is embodied in an appliance other than a basic alarm clock, application specific hardware 310 is included to control and carry out some or all of the normative functions of the appliance. In the case of a telephone device, for example, the application specific hardware would include the hookswitch, flash button, voice-related hardware, etc. In the case of a video recorder of some type the application specific hardware would include a media device, video connections, etc. The application specific hardware may also include microcode or some other form of computer program code notwithstanding the fact that it is referred to herein as "application specific hardware."

With respect to the local timekeeping function of the device of FIG. 3, it can be provided in various ways. The processing system of the example device of FIG. 3 consists of CPU 301 in combination with memory 302, 303, and 304, and any computer or microcode stored therein. The processing system is of course capable of providing timekeeping function and displaying local settings such as the current time, alarm time, etc. on the display unit. However, it may be more convenient to have these normative functions provided by a separate hardware which is incorporated into the display unit or which is provided elsewhere in the device, wherein that separate hardware can be addressed by the processing system. Such would be the case, for example, where a standard "clock-on-a-chip" was used to provide timekeeping function apart from the CPU.

Figures 4, 6:
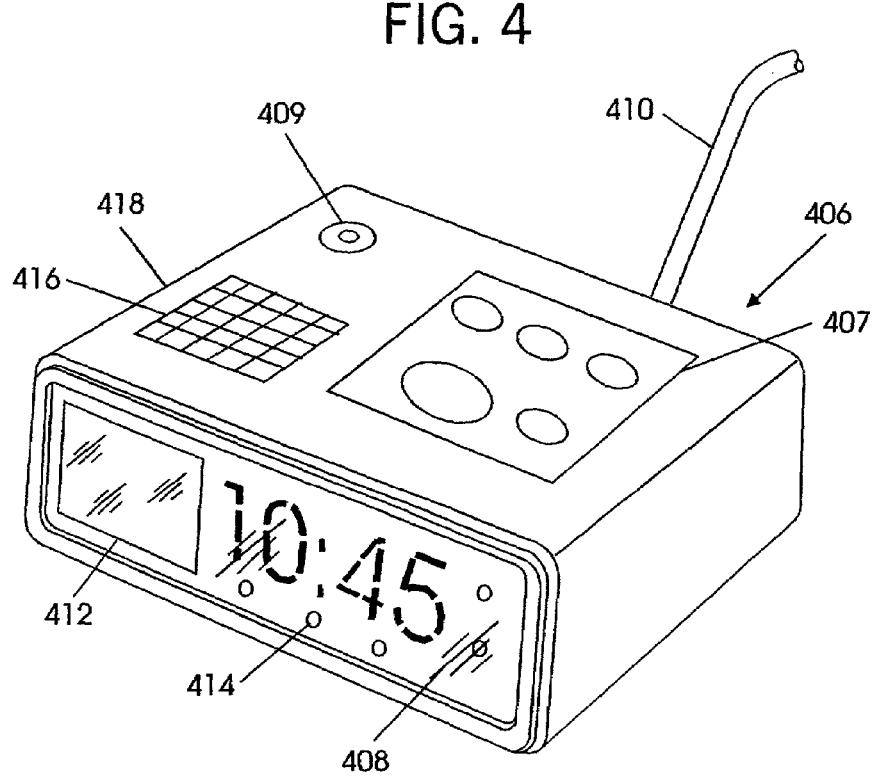
FIG. 4 is a physical, external view of a device according to one embodiment of the invention.
FIG. 6 is a packet message diagram illustrating one type of message that can be sent by a device according to the invention.

FIG. 4 is an external view of an actual device that implements the invention, in this case, a bedside alarm clock that might be used in the home. In the case of external portions of elements illustrated in FIG. 3, correlative reference numbers are used. The external connector portion of the network interface, 406, is not visible. A LAN cable, 410, connects the apparatus to the premises automation system. The external portion of the user input panel, 407, includes a variety of buttons. These buttons can be mechanically actuated, spring type buttons, or can be implemented as a membrane keyboard or any other type of conventional input panel. The optional light or bright LED providing emergency illumination is shown at 409. This particular device also includes speaker 416 through which sound may be caused to play. The sound can be encapsulated in a packet sent over the network interface by the premises automation system in the form a digital file such as a "wave" file, or it can be stored locally and simply referenced or called by a packet received from the premises automation system. All of the components are disposed within a decorative case 418. If the device runs on household AC power, and AC power chord (not shown) will protrude from or be connected to the case.

Display unit 408 can display various type of information related to various functions of the device. The display unit in this example is displaying the current time as "10:45." The display unit may contain individual indicators, 414, such as single element LED's to provide some premises automation display function such as indicating the status of the house. They might also be related to local settings such as A.M. vs. P.M. or whether the alarm is on. Display unit 408 also optionally contains a special alphanumeric area, 412, to display other information such as caller ID information, or specifics about the status of the home automation system. It should be noted that although display unit 408 appears as an LED type display, any type of electronic display will work with the invention, including a liquid crystal display (LCD). All of the information can be displayed by one large, all points addressable alphanumeric display. It is also possible that a small cathode ray tube might be used. Indeed, the display unit and input panel can be thought of as functional elements, and may be combined into one device such as a touch screen.

Figure 5:
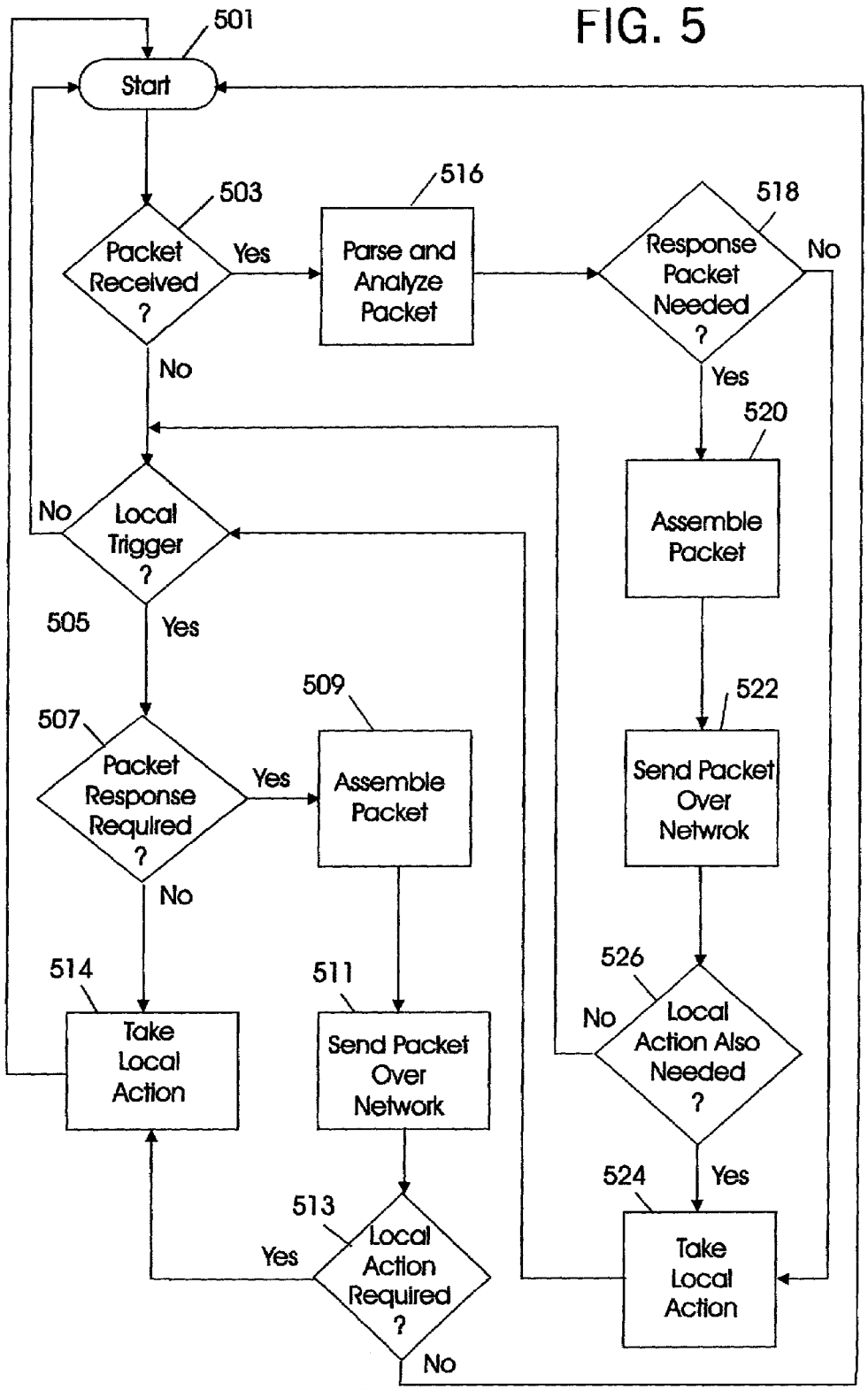
FIG. 5 is a flowchart illustrating the method of the invention according to some embodiments.

FIG. 5 illustrates, in flowchart form, some example methods executed by the device of the invention during normal operation. For purposes of this illustration, it is assumed that messaging is accomplished using a packet-based protocol over a LAN. The process starts at 501, where the device waits until it receives a packet at 503, or a local trigger occurs at 505. A "local trigger" is something that happens locally at the device to initiate action. For example, a local trigger could be a change in a local setting such as the alarm status, or even the position of a button. (A local setting is any setting stored locally in the device, even the status of premises automation displays.) The local trigger could be something related to the normative function of the appliance (setting the alarm in the case of an alarm clock) or a premises automation input function, in which a user pushes a special button designed to control some function of the premises automation system. If a local trigger occurs, a decision is made at 507 as to whether a packet response is required to be sent over the network interface. The packet response could be, for example, a report of user input to be encapsulated in the packet and sent to the premises automation system. If the packet response is required, the packet is assembled in memory at step 509 and sent over the network at step 511. At step 513 a determination is made as to whether a local action is also required, for example, the illumination of a particular display element, or a change in the alarm status. If so, the action is taken at 514. Note that if a packet response was not required by the local trigger received at 505, it is assumed that a local action is required and the local action is taken at 514. An example behavior like that just described occurs when an alarm clock according to the invention is set up so that if the alarm is set by a user (a local trigger), a packet is sent to the premises automation system notifying it of that event, and then a display element is illuminated (a local action) to show that the alarm is set.

It should be noted that at various places in this disclosure packets sent by the device are referred to as being formatted to enable premises automation function. This terminology simply means that a packet is formatted in such a way that it can be parsed and understood by the premises automation system or other device or appliance that receives the packet, irrespective of whether the packetized message is read or causes something to happen in every case. The point is that the packet is formatted to be able to carry out premises automation function. When a "response" is discussed, the term is meant to refer to a substantive response connected with the decision-making processes within the apparatus of the invention, and may not necessarily include standard responses sent over the LAN or serial interface to indicate the receipt of a packet.

If the device of the invention receives a packet at step 503 of FIG. 5, the packet is parsed and analyzed at step 516. A determination is made at step 518 as to whether or not a response is called for. If not, it can be assumed that the purpose of the packet is to cause a local action, such as the updating of timekeeping status information, where timekeeping status information can include, for example the alarms status or the current time. The alarm status in the case of an alarm clock can include one or more of whether the alarm is set, the alarm time, or the snooze status. The received packet may also be designed to initiate a premises automation display function on the device, such as information about the status of the house or the caller-ID of an incoming telephone call. The local action could also be the activation of emergency illumination if the premises automation system has detected a power outage.

If a response packet is needed at step 518, the packet is assembled at step 520, and sent over the network at step 522. A determination is then made at step 524 if a local action (as referred to above) is also required, and that action is taken at step 526 if it is required. One example scenario that follows this branch of the flowchart takes place when the device of the invention receives a packet that inquires as to the current alarm time setting. A response packet would be sent back containing the setting.

FIG. 6 illustrates at least a portion of a format for at least one type of message that could be sent by the apparatus of the present invention over the network interface. This type of message is used to set an output in a premises automation system of the distributed type previously described, and is one possible example of a message formatted to enable premises automation function. The message can form all or a portion of a packet in the case of a packet-based system. Such a packet is more fully described in the related applications, but will be described at least in part here for the convenience of the reader. The packet has a unique output identifier, 601, that has a specific type. Field 602 contains instructions for the desired change for the output specified by the unit number and output number in field 601. The change can be applied to physical outputs, or internal variables, if the internal variables are assigned a unique output identifier. Field 603 can include instructions to change an associated variable for an output if associated variables are allocated to an output, since the type designations are consistent for inputs and outputs.

The output packet command format as shown in FIG. 6 provides for an optional ability to change the associated variables of a specified input within the premises automation system. Optional fields 603 include a unique input identifier 604, as well as the name of the variable, 605, and a new value to which to set the variable, 606. Fields for multiple variables can be added.

Specific embodiments of an invention are described herein. One of ordinary skill in the computing and networking arts will quickly recognize that the invention has other applications in other environments. In fact, many embodiments and implementations are possible. The following claims are in no way intended to limit the scope of the invention to the specific embodiments described above.

I claim:

1. Apparatus operable for providing both time-based normative function and premises automation input to a premises automation system, the apparatus comprising:

a display unit operable to at least display a time;

a network interface operable to provide two-way messaging capability;

an input panel operable to accept user input; and a processing system operatively connected to the display unit, the network interface, and the input panel, the processing system operable to control the apparatus to provide the time-based normative function and the premises automation input function, the premises automation input being provided to the premises automation system by sending and receiving messages connected with the time-based normative function over the network interface from and to the apparatus, wherein the messages are formatted to enable premises automation function and at least some of the messages comprise a packet including an identifier specifying at least one of an output, an input, and a unit number so that the identifier alone can specify any of a plurality of distributed inputs and outputs in the premises automation system.

2. The apparatus of claim 1 wherein at least some of the messages comprise reports of user input.

3. The apparatus of claim 2 wherein at least some of the messages comprise timekeeping status information.

4. The apparatus of claim 3 wherein the apparatus is further operable as an alarm clock.

5. The apparatus of claim 2 wherein the apparatus further comprises application specific hardware enabling the apparatus to operate as a kitchen appliance.

6. The apparatus of claim 2 wherein the apparatus further comprises application specific hardware enabling the apparatus to operate as a telephone.

7. The apparatus of claim 2 wherein the apparatus further comprises application specific hardware for control of a lawn sprinkler system.

8. The apparatus of claim 2 wherein the apparatus further comprises application specific hardware for lighting control.

9. The apparatus of claim 2 wherein the apparatus further comprises application specific hardware enabling the apparatus to operate as a laundry appliance.

10. The apparatus of claim 2 wherein the apparatus further comprises application specific hardware to enable the apparatus to operate as an HVAC device.

11. The apparatus of claim 2 wherein the apparatus further comprises application specific hardware to enable the apparatus to operate as an audio/video entertainment device.

12. The apparatus of claim 1 wherein at least some of the messages comprise timekeeping status information.

13. In an appliance including a time-based control function, a method of communicating with a premises automation system, the method comprising:

detecting user input, wherein the user input is primarily directed to controlling a normative function of the appliance;

assembling a message comprising information regarding the user input, wherein the message is formatted to enable a premises automation function and comprises a packet including an identifier specifying at least one of an output, an input, and a unit number so that the identifier alone can specify any of a plurality of distributed inputs and outputs in the premises automation system; and sending the message to the premises automation system over a network interface disposed within the appliance.

14. The method of claim 13 wherein the appliance is an alarm clock.

15. The method of claim 13 wherein the appliance is a kitchen appliance.

16. The method of claim 13 wherein the appliance is a telephone appliance.

17. The method of claim 13 wherein the appliance is for control of a lawn sprinkler system.

18. The method of claim 13 wherein the appliance is for lighting control.

19. The method of claim 13 wherein the appliance is a laundry appliance.

20. The method of claim 13 wherein the appliance is an HVAC device.

21. The method of claim 13 wherein the appliance is an audio/video entertainment device.

22. An appliance including a time-based control function and apparatus for communicating with a premises automation system, the appliance comprising:

means for detecting user input, wherein the user input is primarily directed to controlling a normative function of the appliance;

means for assembling a message comprising information regarding the user input, wherein the message is formatted to enable a premises automation function and comprises a packet including an identifier specifying at least one of an output, an input, and a unit number so that the identifier alone can specify any of a plurality of distributed inputs and outputs in the premises automation system; and means for sending the message to the premises automation system over a network interface disposed within the appliance.

23. An appliance operable for providing both time-based control function and premises automation input to a premises automation system, the appliance comprising:

a display unit operable to at least display a time;

a network interface operable to provide two-way messaging capability, an input panel operable to accept user input; and a processing system operatively connected to the display unit, the network interface, and the input panel, the processing system operable to control the appliance to detect user input primarily directed to controlling normative function of the appliance and send a message over the network interface to the premises automation system, the message comprising information regarding the user input, the message further being formatted to enable premises automation function and comprising a packet including an identifier specifying at least one of an output, an input, and a unit number so that the identifier alone can specify any of a plurality of distributed inputs and outputs in the premises automation system.

24. The appliance of claim 23 wherein the appliance is further operable as an alarm clock.

25. The appliance of claim 23 wherein the appliance further comprises application specific hardware enabling the appliance to operate as a kitchen appliance.

26. The appliance of claim 23 wherein the appliance further comprises application specific hardware enabling the appliance to operate as a telephone.

27. The appliance of claim 23 wherein the appliance further comprises application specific hardware for control of a lawn sprinkler system.

28. The appliance of claim 23 wherein the appliance further comprises application specific hardware for lighting control.

29. The appliance of claim 23 wherein the appliance further comprises application specific hardware enabling the appliance to operate as a laundry appliance.

30. The appliance of claim 23 wherein the appliance further comprises application specific hardware to enable the appliance to operate as an HVAC device.

31. The appliance of claim 23 wherein the appliance further comprises application specific hardware to enable the appliance to operate as an audio/video entertainment device.

* * * * *